(12) United States Patent
Owens et al.

(10) Patent No.: US 7,840,984 B1
(45) Date of Patent: Nov. 23, 2010

(54) MEDIA ADMINISTERING SYSTEM AND METHOD

(75) Inventors: Steve B. Owens, Kansas City, MO (US); Alan Jacobs, Longwood, FL (US)

(73) Assignee: Embarq Holdings Company, LLC, Overland Park, KS (US)

(*) Notice: Subject to any disclaimer, the term of this patent is extended or adjusted under 35 U.S.C. 154(b) by 1071 days.

(21) Appl. No.: 10/803,046

(22) Filed: Mar. 17, 2004

(51) Int. Cl.
*H04N 7/18* (2006.01)
*H04N 7/173* (2006.01)

(52) U.S. Cl. .................. 725/82; 725/80; 725/93; 725/116; 725/122

(58) Field of Classification Search .................. 725/93
See application file for complete search history.

(56) References Cited

U.S. PATENT DOCUMENTS

| | | | |
|---|---|---|---|
| 3,703,714 A | 11/1972 | Andrews | |
| 3,997,718 A * | 12/1976 | Ricketts et al. | 725/114 |
| 4,303,937 A | 12/1981 | Cook | |
| 4,375,637 A | 3/1983 | Desjardins | |
| 4,866,515 A | 9/1989 | Tagawa et al. | |
| 4,872,195 A | 10/1989 | Leonard | |
| 4,959,713 A | 9/1990 | Morotomi et al. | |
| 4,992,866 A | 2/1991 | Morgan | |
| 5,027,211 A | 6/1991 | Robertson | |
| 5,061,916 A | 10/1991 | French et al. | |
| 5,086,385 A | 2/1992 | Launey | |
| 5,109,222 A | 4/1992 | Welty | |
| 5,172,413 A | 12/1992 | Bradley et al. | |
| 5,187,735 A | 2/1993 | Garcia et al. | |
| 5,310,349 A | 5/1994 | Daniels et al. | |
| 5,479,267 A | 12/1995 | Hashimoto | |
| 5,550,863 A * | 8/1996 | Yurt et al. | 375/240 |
| 5,565,908 A * | 10/1996 | Ahmad | 725/93 |
| 5,585,838 A | 12/1996 | Lawler et al. | |
| 5,601,432 A | 2/1997 | Bergman | |
| 5,621,456 A | 4/1997 | Florin et al. | |
| 5,684,952 A | 11/1997 | Stein | |
| 5,790,176 A * | 8/1998 | Craig | 725/115 |
| 5,790,935 A | 8/1998 | Payton | |
| 5,940,594 A | 8/1999 | Ali et al. | |
| 6,020,881 A | 2/2000 | Naughton et al. | |

(Continued)

FOREIGN PATENT DOCUMENTS

EP 1 445 917 8/2004

(Continued)

OTHER PUBLICATIONS

Sprint TekNet IP for Higher Education press release.

(Continued)

*Primary Examiner*—Brian T Pendleton
*Assistant Examiner*—Ryan Stronczer
(74) *Attorney, Agent, or Firm*—SNR Denton US LLP (57) ABSTRACT

Disclosed is a system and method for delivering digital audio/visual content over a facilities analog-based television network, such as the cable network of a school. An administrator is provided that includes a video server, a DVD/decoder, a controller for the DVD/decoder, and a modulator. The system enables the school to access video on demand while bypassing its existing computer network. This avoids congesting the computer network with the streamed video.

5 Claims, 5 Drawing Sheets

U.S. PATENT DOCUMENTS

| | | | |
|---|---|---|---|
| 6,038,425 | A | 3/2000 | Jeffrey |
| 6,049,823 | A | 4/2000 | Hwang |
| 6,060,994 | A | 5/2000 | Chen |
| 6,072,395 | A | 6/2000 | Vega |
| 6,149,441 | A | 11/2000 | Pellegrino et al. |
| 6,182,128 | B1 | 1/2001 | Kelkar et al. |
| 6,185,773 | B1 | 2/2001 | Goedde |
| 6,192,282 | B1 | 2/2001 | Smith et al. |
| 6,233,428 | B1 | 5/2001 | Fryer |
| 6,240,410 | B1 | 5/2001 | Wical |
| 6,370,323 | B1* | 4/2002 | Adolph et al. ............. 386/104 |
| 6,374,079 | B1 | 4/2002 | Hsu |
| 6,438,596 | B1 | 8/2002 | Ueno et al. |
| 6,501,502 | B1 | 12/2002 | Chen |
| 6,507,726 | B1 | 1/2003 | Atkinson et al. |
| 6,561,812 | B1 | 5/2003 | Burmester et al. |
| 6,661,340 | B1 | 12/2003 | Saylor et al. |
| 6,748,597 | B1* | 6/2004 | Frisco et al. ............... 725/76 |
| 6,769,127 | B1 | 7/2004 | Bonomi et al. |
| 6,775,518 | B2 | 8/2004 | Norcott et al. |
| 6,813,777 | B1 | 11/2004 | Weinberger et al. |
| 6,844,807 | B2 | 1/2005 | Inoue et al. |
| 6,879,243 | B1 | 4/2005 | Booth et al. |
| 6,925,499 | B1 | 8/2005 | Chen et al. |
| 6,970,183 | B1 | 11/2005 | Monroe |
| 6,975,346 | B2 | 12/2005 | Kumhyr |
| 7,028,096 | B1 | 4/2006 | Lee |
| 7,035,390 | B2 | 4/2006 | Elliott |
| 7,046,689 | B2 | 5/2006 | Burnes et al. |
| 7,123,142 | B2 | 10/2006 | Bohbot et al. |
| 7,159,233 | B2 | 1/2007 | Son et al. |
| 7,185,282 | B1 | 2/2007 | Naidoo et al. |
| 7,246,369 | B1 | 7/2007 | Duan et al. |
| 7,697,927 | B1 | 4/2010 | Owens |
| 2002/0033760 | A1 | 3/2002 | Kobayashi |
| 2002/0038461 | A1 | 3/2002 | White et al. |
| 2002/0048224 | A1 | 4/2002 | Dygert et al. |
| 2002/0049977 | A1 | 4/2002 | Miller et al. |
| 2002/0112121 | A1* | 8/2002 | Gerszberg et al. ........... 711/118 |
| 2002/0124258 | A1 | 9/2002 | Fritsch |
| 2002/0138842 | A1 | 9/2002 | Chong et al. |
| 2002/0164155 | A1 | 11/2002 | Mate |
| 2002/0166123 | A1 | 11/2002 | Schrader et al. |
| 2002/0170064 | A1 | 11/2002 | Monroe et al. |
| 2002/0180579 | A1 | 12/2002 | Nagaoka et al. |
| 2003/0009668 | A1* | 1/2003 | Chan et al. ................. 713/171 |
| 2003/0046369 | A1 | 3/2003 | Sim et al. |
| 2003/0050935 | A1 | 3/2003 | Spetsmann |
| 2003/0051239 | A1 | 3/2003 | Hudspeth |
| 2003/0105854 | A1 | 6/2003 | Thorsteinsson et al. |
| 2003/0121050 | A1 | 6/2003 | Kalva et al. |
| 2003/0123450 | A1 | 7/2003 | Wright et al. |
| 2003/0182420 | A1 | 9/2003 | Jones et al. |
| 2003/0191802 | A1 | 10/2003 | Zhao et al. |
| 2003/0200009 | A1 | 10/2003 | Von Kannewurff et al. |
| 2003/0204856 | A1* | 10/2003 | Buxton ....................... 725/120 |
| 2003/0208762 | A1 | 11/2003 | Hanai et al. |
| 2004/0003051 | A1 | 1/2004 | Krzyzanowski et al. |
| 2004/0015993 | A1 | 1/2004 | Yacenda et al. |
| 2004/0039757 | A1 | 2/2004 | McClure |
| 2004/0049789 | A1 | 3/2004 | Bower et al. |
| 2004/0117638 | A1 | 6/2004 | Monroe |
| 2004/0117647 | A1* | 6/2004 | Ballard ....................... 713/200 |
| 2004/0148632 | A1 | 7/2004 | Park et al. |
| 2004/0172658 | A1 | 9/2004 | Rakib et al. |
| 2004/0194148 | A1* | 9/2004 | Schultz et al. .............. 725/122 |
| 2004/0210944 | A1 | 10/2004 | Brassil et al. |
| 2004/0253945 | A1 | 12/2004 | Janik |
| 2004/0268410 | A1 | 12/2004 | Barton et al. |
| 2005/0003338 | A1 | 1/2005 | Norcott |
| 2005/0028208 | A1* | 2/2005 | Ellis et al. .................... 725/58 |
| 2005/0044166 | A1 | 2/2005 | Colville et al. |
| 2005/0078934 | A1* | 4/2005 | Fish et al. ....................... 386/1 |
| 2005/0080818 | A1 | 4/2005 | Kindberg et al. |
| 2005/0125083 | A1 | 6/2005 | Kiko |
| 2005/0131957 | A1 | 6/2005 | Watkinson |
| 2005/0177853 | A1 | 8/2005 | Williams et al. |
| 2005/0193098 | A1 | 9/2005 | Khandpur et al. |
| 2005/0206513 | A1 | 9/2005 | Fallon |
| 2005/0215244 | A1 | 9/2005 | Whitson |
| 2005/0254440 | A1 | 11/2005 | Sorrell |
| 2005/0278773 | A1 | 12/2005 | DeCinque et al. |
| 2006/0005224 | A1 | 1/2006 | Dunning et al. |
| 2006/0020993 | A1 | 1/2006 | Hannum et al. |
| 2006/0069736 | A1 | 3/2006 | Czeisler et al. |
| 2006/0085824 | A1 | 4/2006 | Bruck et al. |
| 2006/0088806 | A1 | 4/2006 | Quinn |
| 2007/0006276 | A1 | 1/2007 | Ashley et al. |
| 2007/0050828 | A1 | 3/2007 | Renzi et al. |
| 2007/0130590 | A1 | 6/2007 | Nash-Putnam |
| 2008/0016545 | A1 | 1/2008 | DeCinque et al. |
| 2008/0092168 | A1 | 4/2008 | Logan et al. |

FOREIGN PATENT DOCUMENTS

| | | |
|---|---|---|
| JP | 2002-002486 | 1/2002 |

OTHER PUBLICATIONS

Sprint TekNet IP Overview press release.
System Integrates All School Tech Functions press release.
Sprint TekNet IP Integrated Communications System, Installation Overview.
Sprint TekNet IP Installation Manual.
IC-Net Systems—FF Coax Network, ICC-Smart TV Controllers.
TrueCom Building Communications Systems Communications Controllers 5120 Series, May 1998, Publication S5120-0012-7, pp. 1-6.
Advancements Bring Windows-based Software, Ethernet Network Ccompatibility to 5120 Intercom Systems, Feb. 2001, pp. 1-2.
Non-Final Office Action dated Mar. 23, 2007 for U.S. Appl. No. 10/236,286.
Response filed Jul. 23, 2007 to Non-Final Office Action dated Mar. 23, 2007 for U.S. Appl. No. 10/236,286.
Final Office Action dated Oct. 16, 2007 for U.S. Appl. No. 10/236,286.
Response filed Oct. 26, 2007 to Final Office Action dated Oct. 16, 2007 for U.S. Appl. No. 10/236,286.
Advisory Action dated Nov. 19, 2007 for U.S. Appl. No. 10/236,286.
Non-Final Office Action dated Feb. 13, 2008 for U.S. Appl. No. 10/236,286.
Response filed May 13, 2008 to Non-Final Office Action dated Feb. 13, 2008 for U.S. Appl. No. 10/236,286.
Final Office Action dated Sep. 10, 2008 for U.S. Appl. No. 10/236,286.
Non-Final Office Action dated Nov. 16, 2006 for U.S. Appl. No. 10/928,568.
Response filed Feb. 16, 2007 to Non-Final Office Action dated Nov. 16, 2006 for U.S. Appl. No. 10/928,568.
Final Office Action dated May 21, 2007 for U.S. Appl. No. 10/928,568.
Response filed Jul. 20, 2007 to Final Office Action dated May 21, 2007 for U.S. Appl. No. 10/928,568.
Non-Final Office Action dated Oct. 10, 2007 for U.S. Appl. No. 10/928,568.
Response filed Jan. 8, 2007 to Non-Final Office Action dated Oct. 10, 2007 for U.S. Appl. No. 10/928,568.
Final Office Action dated Apr. 28, 2008 for U.S. Appl. No. 10/928,568.
RCE and Response filed Jun. 30, 2008 to Final Office Action dated Apr. 28, 2008 for U.S. Appl. No. 10/928,568.
Non-Final Office Action dated Aug. 1, 2008 for U.S. Appl. No. 11/074,861.
Response filed Nov. 3, 2008 to Non-Final Office Action dated Aug. 1, 2008 for U.S. Appl. No. 11/074,861.

Non-Final Office Action dated Oct. 18, 2007 for U.S. Appl. No. 11/042,263.
Response filed Jan. 18, 2008 Non-Final Office Action dated Oct. 18, 2007 for U.S. Appl. No. 11/042,263.
Final Office Action dated Apr. 18, 2008 for U.S. Appl. No. 11/042,263.
RCE and Response filed Jul. 18, 2008 Final Office Action dated Apr. 18, 2008 for U.S. Appl. No. 11/042,263.
Non-Final Office Action dated Aug. 21, 2008 for U.S. Appl. No. 11/042,263.
Response filed Nov. 21, 2008 Non-Final Office Action dated Aug. 21, 2008 for U.S. Appl. No. 11/042,263.
Non-Final Office Action date mailed Jan. 21, 2009 for U.S. Appl. No. 10/694,337.
Non-Final Office Action date mailed Nov. 10, 2008 for U.S. Appl. No. 10/951,740.
Response filed Feb. 10, 2009 to Non-Final Office Action date mailed Nov. 10, 2008 for U.S. Appl. No. 10/951,740.
Advisory Action date mailed Jul. 28, 2008 for U.S. Appl. No. 10/928,568.
RCE/Response filed Oct. 28, 2008 to Final Office Action date mailed Apr. 28, 2008 for U.S. Appl. No. 10/928,568.
Non-Final Office Action date mailed Jan. 9, 2009 for U.S. Appl. No. 10/928,568.
Final Office Action date mailed Jan. 7, 2009 for U.S. Appl. No. 11/074,861.
Response filed Mar. 18, 2009 to Non-Final Action dated Jan. 21, 2009 in U.S. Appl. No. 10/694,337.
Final Rejection date mailed Jun. 18, 2009 in U.S. Appl. No. 10/694,337.
Response filed Aug. 13, 2009 to Final Rejection dated Jun. 18, 2009 in U.S. Appl. No. 10/694,337.
Advisory Action date mailed Aug. 31, 2009 in U.S. Appl. No. 10/694,337.
Pre-Appeal Brief Request for Review and Remarks to same; Notice of Appeal all filed on Sep. 18, 2009 in U.S. Appl. No. 10/694,337.
Pre-Appeal Conference Decision date mailed Nov. 18, 2009 in U.S. Appl. No. 10/694,337.
RCE/Amendment filed Dec. 16, 2009 in U.S. Appl. No. 10/694,337.
Non-Final Rejection date mailed Jan. 20, 2010 in U.S. Appl. No. 10/694,337.
Final Rejection date mailed Jun. 19, 2009 in U.S. Appl. No. 10/951,740.
RCE/Amendment filed Sep. 1, 2009 to Final Rejection dated Jun. 19, 2009 in U.S. Appl. No. 10/951,740.
Non-Final Rejection date mailed Oct. 15, 2009 in U.S. Appl. No. 10/951,740.
Response filed Jan. 15, 2010 to Non-Final Rejection date mailed Oct. 15, 2009 in U.S. Appl. No. 10/951,740.
Response filed Apr. 9, 2009 to Non-Final Action date mailed Jan. 29, 2009 in U.S. Appl. No. 10/928,568.
Final Rejection date mailed Jul. 30, 2009 U.S. Appl. No. 10/928,568.
Non-Final Rejection date mailed Apr. 2, 2009 in U.S. Appl. No. 11/897,439.
Response filed Apr. 16, 2009 to Non-Final Action date mailed Apr. 2, 2009 in U.S. Appl. No. 11/897,439.
Final Rejection date mailed Jul. 14, 2009 in U.S. Appl. No. 11/897,439.
Response filed Aug. 4, 2009 to Final Rejection dated Jul. 14, 2009 in U.S. Appl. No. 11/897,439.
Advisory Action date mailed Sep. 18, 2009 in U.S. Appl. No. 11/897,439.
RCE/Amendment filed Oct. 5, 2009 in U.S. Appl. No. 11/897,439.
Non-Final Rejection date mailed Dec. 16, 2009 in U.S. Appl. No. 11/897,439.
Final Rejection date mailed Mar. 4, 2009 in U.S. Appl. No. 11/042,263.
Pre-Appeal Request for Review and Remarks to same; Notice of Appeal all filed on Apr. 10, 2009 in U.S. Appl. No. 11/042,263.
Pre-Brief Appeal Conference Decision date mailed Sep. 8, 2009 in U.S. Appl. No. 11/042,263.
Notice of Allowance and Fees Due date mailed Dec. 7, 2009 in U.S. Appl. No. 11/042,263.
RCE/Amendment filed Feb. 27, 2009 to Final Action dated Jan. 7, 2009 in U.S. Appl. No, 11/074,861.
Non-Final Rejection date mailed Mar. 23, 2009 in U.S. Appl. No. 11/074,861.
Response filed Apr. 16, 2009 to Non-Final Rejection date mailed Mar. 23, 2009 in U.S. Appl. No. 11/074,861.
Final Rejection date mailed Jun. 10, 2009 in U.S. Appl. No. 11/074,861.
Response filed Aug. 10, 2009 to Final Action dated Jun. 10, 2009 in U.S. Appl. No. 11/074,861.
Advisory Action date mailed Aug. 26, 2009 in U.S. Appl. No. 11/074,861.
RCE/Amendment filed Sep. 8, 2009 in U.S. Appl. No. 11/074,861.
Non-Final Rejection date mailed Oct. 14, 2009 in U.S. Appl. No. 11/074,861.
Amendment filed Jan. 13, 2010 to Non-Final Rejection dated Oct. 14, 2009 in U.S. Appl. No. 11/074,861.
Examiner Interview Summary date mailed Jan. 13, 2010 in U.S. Appl. No. 11/074,861.
Final Rejection date mailed Apr. 9, 2010 issued in U.S. Appl. No. 10/951,740.
Notice of Abandonment date mailed Mar. 3, 2010 in U.S. Appl. No. 10/928,568.
Notice of Allowance date mailed Apr. 14, 2010 in U.S. Appl. No. 11/074,861.
Response filed Feb. 26, 2010 to Non-Final Rejection date mailed Jan. 20, 2010 in U.S. Appl. No. 10/694,337.
Examiner Interview Summary date mailed Mar. 5, 2010 in U.S. Appl. No. 10/694,337.
Reply filed Mar. 3, 2010 to Non-Final Rejection dated mailed Dec. 16, 2010 in U.S. Appl. No. 11/897,439.

* cited by examiner

MEDIA ADMINISTERING SYSTEM AND METHOD

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

This invention relates to the field of media and communication control devices. More specifically, this invention relates to the technologies of controlling a data stream from a data stream source and decoding it so that it may be used by the existing media playing network of a facility.

2. Description of the Related Art

Schools have traditionally used intercoms, paging systems, and public address systems. Over the years, technologies developed enabling the use of more advanced audio-visual equipment. For example, it's not unusual for the rooms in a school, or other facility, interconnected by an existing cable network. On each cable network, numerous media players, for example televisions, are all shared. Each of these media players are capable of receiving analog signals. The signals are combined. Different signals may be accessed by changing the channel. The source for these signals could come from outside the facility in some sort of broadcast or cable transmittal. The signal might have also come from a media device, such as a VCR or DVD within the facility.

Figure 1:
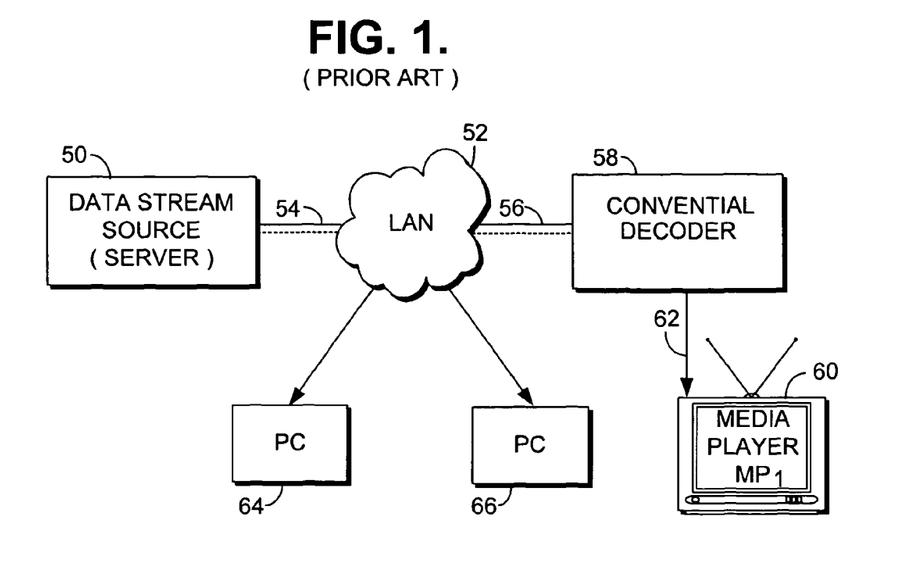
FIG. 1 is a schematic representation of a typical prior art media administering system for a facility.

As technology progressed further, different sources of the media were used. FIG. 1 shows a conventional arrangement in which media is transmitted to a media player using a digital signal. The source of the digital signal is a data stream source 50. Source 50 is typically some sort of server. Server 50 will typically contain numerous data files. These data files will most likely contain compressed and stored motion video and animation in digital form. The most common type of such files are referred to as MPEG's. Server 50 may contain numerous different types of MPEG's, but also might contain multiple instances of each particular MPEG so that the same movie (or other audio-visual file) may be viewed simultaneously at different times.

These files will be delivered to an end user by way of a data stream 54. Data stream 54 is a digital signal. It is a continuous stream of data elements which when transmitted will be used to create the desired audio visual presentation.

This prior art system works through the facility's local area network ("LAN"). In most facilities, e.g. schools, the LAN 52 is unable to effectively handle large volumes of data traffic. This is because such systems were traditionally not meant to handle data streaming. They are instead designed to handle data transmissions in the form of separate records, rather than unbounded streams.

This kind of system typically has numerous work stations, or PCs tapped into it which are all part of a workgroup on the network. PCs 64 and 66 are examples of two PCs on the same network. Data stream 54 is delivered through LAN 52. It is drawn out of LAN 52 as data stream 56 into a decoder 58.

Decoders are necessary to convert a digital data stream into an analog signal which can be accessed by televisions and other media playing devices. These are readily commercially available, and are expensive. Probably five or six times more expensive than a standard television. Decoder 58 is used in FIG. 1 to convert data stream 56, which is a digital signal, into an analog/RF signal 62. Analog signals are used to operate television sets, or other audio visual devices. A media player ($MP_1$) 60 will be used in a part of the facility, e.g. a school classroom, using signal 62 after it has been decoded. With this FIG. 1 type arrangement, a separate decoder is required for every media player in each particular classroom.

This arrangement is problematic for at least two reasons. First, the amount of data traffic passing through the LAN 52 is oftentimes excessive. This is because data streams 54 passing there through tends to tie the system up. The transmission of MPEG's will require too much of the LAN's resources. This may seriously interfere with the operation of PCs 64, 66 and any other computing devices shared in the network. Most vintage LANs are simply incapable of handling the kind of volume delivered during the data streaming of MPEGs or other audio-video signals. Therefore, there is a need in the art for a process or system that would alleviate the data congestion caused.

The second problem with this prior art system is that the decoders are excessively expensive. As can be recalled from above, a separate decoder (such as decoder 58) must be provided for each individual media player (such as media player 60) existent on the system. For numerous classrooms, this requires numerous decoders. Oftentimes this will be overburdensome from a budgetary standpoint because the decoders are so expensive.

SUMMARY OF THE INVENTION

The present invention avoids these problems existent in the prior art by providing a facility media administrator which bypasses the facility's local area network ("LAN"). It uses a controller to manage a number of DVD/decoders in order to interact with the facility's existing cable network of media players.

The system essentially includes a data stream source. The data stream source includes a first data stream. The data stream may comprise an audio/video communication, such as a movie or instructional video. Also included in the system is a DVD/decoder. The DVD/decoder is used for receiving the first data stream from its source. It then coverts the digital data stream into an analog signal which is useable by the facilities existing cable network.

A controller is provided which provides a plethora of functions. It may be interfaced by a user remotely by phone or computer. It may activates or deactivates the decoder according to instructions received by interfacing.

A media player, such as a television, is used to receive the analog signal from the DVD/decoder and deploy the communication to a room or other location within the facility (school).

The system is entirely contained. The data streams delivered from the data stream source will not pass through the local area network of the facility. This is so because the data stream source, controller, DVD/decoders, and all other equipment necessary to interact with the facilities existing coaxial cable network are all incorporated within the system. Thus, the voluminous streamed digital video signals will not interfere with the facility's existing local area network.

Also within the system, the signals delivered from the DVD/decoders may be modulated and combined. This enables them to be accessed through the facilities existing coaxial cable network. Thus, the system avoids the necessity of purchasing and installing a decoder for each television in each classroom.

The system is very user friendly. It may be controlled using the facility's telephone system, a PC linked to the controller in the system, or even a PC patched in through the system's network. These options make it extremely easy for the user, e.g. a teacher, to achieve video on demand from a classroom.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 2:
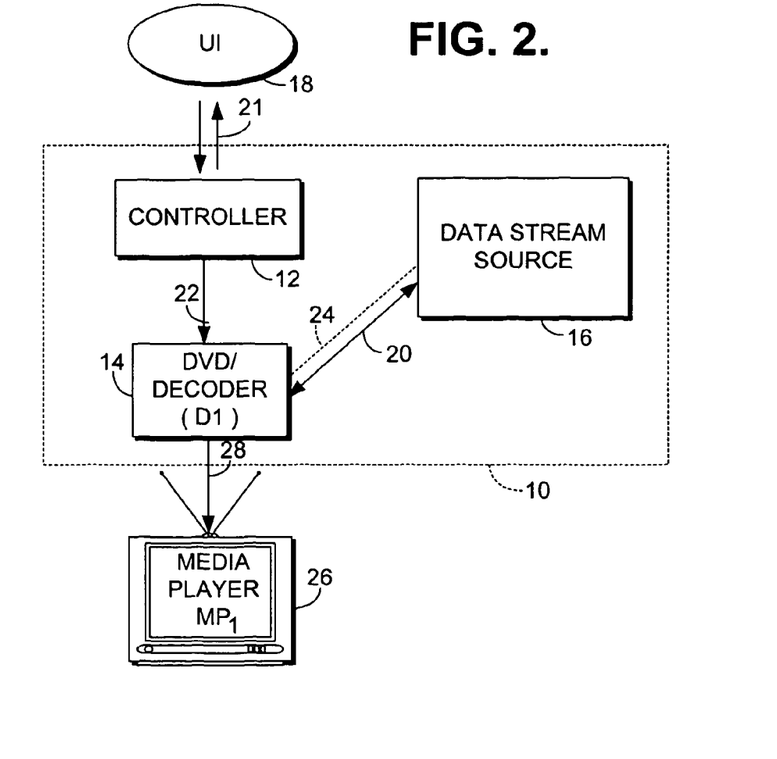
FIG. 2 shows a simplified version of the system of the present invention in schematic form.

Some embodiments of the present invention are shown in FIGS. 2 through 7. FIG. 2 is a simplified version of the arrangement of the present invention. Referring first to FIG. 2, we see that an administrator 10 is used to deliver an audio-visual signal to a media player 26 at the direction of communications through a user interface 18. Administrator 10 comprises three components.

The first component of administrator 10 is a data stream source 16. The data stream source used here is a standard server containing numerous audio-visual files. In this embodiment, these audio-visual files are in Moving Pictures Expert Group (MPEG) format. Other formats are, of course, possible, and are considered to fall within the scope of the present invention. Some examples of other formats include JPEG, TIFF, Bitmap, Photoshop, and Picture image formats, MP3 and WMA audio formats. MPEGs may be in MPEG1, MPEG2, and MPEG4 video formats.

Typically, source 16 will maintain numerous different audio-visual files thereon. There will also, however, be multiple instances of many or all of these files. This is done so that different users may watch the same video at the same time, but have different start and end times. Each user may thus watch a different instance of the same MPEG. This enables video on demand to each room in the facility.

Figure 4:
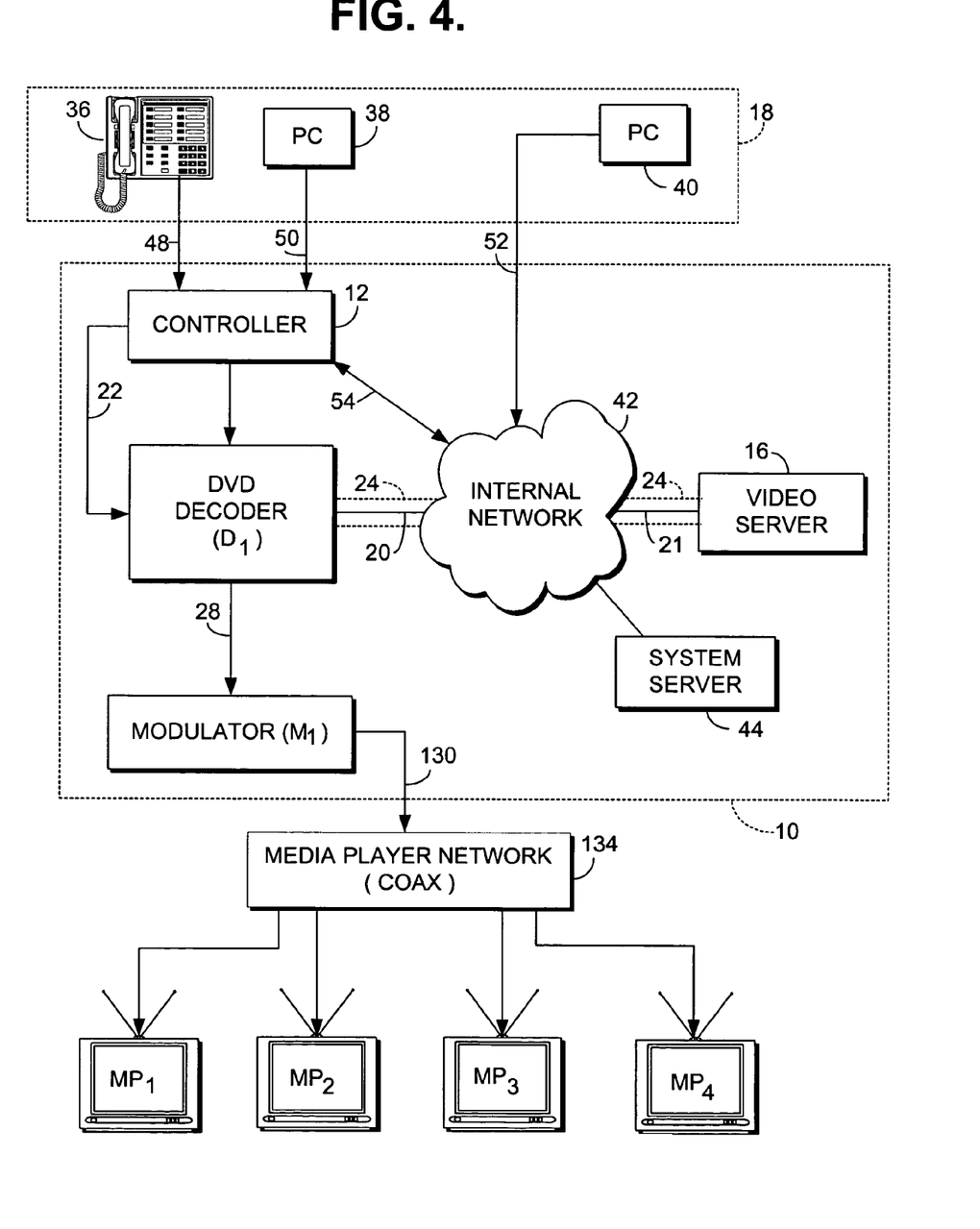
FIG. 4 shows more details regarding the multiple ways in which the user may interface with the system, and also this shows more specifics regarding the systems' internal operations.

Another component included in administrator 10 is a controller 12. Controller 12 serves numerous purposes. More specifics regarding controller 12 will be described hereinafter. Additionally, the physical embodiment of controller 12 may be seen in FIGS. 6 and 7. Controller 12 may be operated using one of numerous interfacing options. These options of communicating with controller 12 will be discussed in more detail hereinafter. (See below where FIG. 4 is discussed.) Controller 12 is able to communicate with data stream source 16 through the DVD/decoder 14. DVD/decoder will enable the selection of a particular audio/video files (MPEG's) for playing to the media player.

DVD/decoder 14 is a newly developed off-the-shelf item. Two versions now commercially available are GoVideo™ networked DVD player or a Gateway™ connected DVD player. Like a conventional DVD player, these new devices include a CD player in which the user may simply insert a CD and play it on a television or other media player. In addition to these older technologies, however, the new DVD/decoders are able to stream movies, music, and pictures from a digital system to an analog electronics component. They come with software that will be loaded onto stream source 16 in a manner that will be known to those skilled in the art. This software enables the DVD/decoder to access audio/video files on the source 16 and then stream the file over the decoder. The software is made available by the manufacturer.

This streaming technology enables music, movies and pictures stored on the data stream source 16 to be accessed on media player 26. It can easily stream audio, pictures and video files from source 16 in JPEG, TIFF, Bitmap, Photoshop, and Picture image formats, MP3 and WMA audio formats, and MPEG1, MPEG2, and MPEG4 video formats.

Such units are very inexpensive. Only a little more expensive than a standard DVD player. This is because traditional DVD players have always had provision for decoding a digital MPEG stream therein. A standard DVD player works by taking digital information (in MPEG format) off of a DVD disc and converting it into an analog signal. An analog signal has parameters (e.g., amplitude, frequency, phase) which can change continuously within a given range. This is different than a digital signal which discrete values are transmitted. Usually these values are binary. The new DVD/decoder devices take advantage of the affordable digital to analog conversion abilities existent in these traditional devices. All that has been done with the new DVD/decoder devices is to enable them to take an MPEG streaming stream to signal from outside the unit (e.g., an on demand server) and then enabling the analog signal to be used by a traditional cable or television setup.

Like a standard DVD player, these DVD/decoders are activated and controlled by infrared signals. They come off the shelf able to be controlled by infrared devices. Controller 12 has been developed to take advantage of these off-the-shelf infrared-response characteristics.

Controller 12 controls DVD/decoder 14 using infrared signals 22. These signals may be delivered remotely, but in some instances it will be advantageous to provide an infrared extension onto the emitter to ensure accurate infrared communications. The sendable signals 22 are adapted to be receivable by DVD/decoder 14 in the way it was designed to be operated as purchased from the manufacturer. Thus, the person setting up or maintaining the system never has to go into the box, so to speak, in order to set up DVD/decoder 14.

DVD/decoder 14 is used here to decode the digital data stream 24 as it is streamed over channel 20 from data stream source 16. Channel 20 may comprise an Ethernet connection, or numerous other possible forms of IP connectivity. Wireless connections are also a possibility here. The data streamed digital signal will ultimately be transmitted over this same channel 20.

The data stream 24 in MPEG format will be decoded into an analog signal 28 which may be used by a standard media player ($MP_1$) 26.

Here, media player ($MP_1$) 26 is a standard television. It could, however, be one of any number of signal receiving devices. Some examples of analog receiving devices other than televisions might be VCR's, stereo systems, etc. The present invention is not intended to be limited to any particular device, such as player 26.

In operation, administrator 10 is able to deliver on demand video to media player ($MP_1$) 26. Media player ($MP_1$) 26 is located on the existing cable network within the facility. Media player ($MP_1$) 26 is located preferably in the same room as controller 12 is interfaced 18 from.

Transmission of the audio/visual presentation is begun by interfacing with controller 12. This is done using any number of user interfaces 18 existent.

One example of a user interface 18 into controller 12 is a telephone hookup directly into controller 12 (see FIG. 4). In this circumstance the telephone, preferably located in the user's classroom, is used to communicate with controller 12 through the facilities existing phone system. The interface could, however, also be located in some remote location. (E.g., another classroom, the user's home, the principal's office). The most common foreseen use, though, is where the user interfaces from the particular classroom in which the media player ($MP_1$) 26 is located.

The user is given a series of prompts initiated by controller 12 which enable them to select a particular video from data stream source 16. Preferably, these prompts and selections will be synchronously visible on the media player ($MP_1$) 26 in the room in the facility. DVD/decoder may have to be powered up by infrared signals 22 which may power on decoder 14 (if it is not already on), appropriately channel it.

The user next will have to select the file to be played. This is done by identifying the appropriate MPEG file in source 16. The user (e.g. a teacher) is able to see what file he or she is selecting while making the selections. Data stream source 16 (e.g., a server) receives commands directly from DVD/Decoder 14. These commands are recognized by the software installed on the server to enable the file selection. Thus, data stream source 16 is interfaced with so that a particular data file (e.g., movie or video) may be selected and played. And the user is able to accomplish all this by simply using the phone in the room while watching what he or she is doing on media player ($MP_1$).

Once instructed by the user, source 16 begins delivery of a selected audio-video file (e.g., an MPEG) which is then video streamed over channel 20 to DVD/decoder ($D_1$) 14. DVD/decoder ($D_1$) 14 then converts the digital signal 24 into an analog signal 28.

The analog signal is then viewable by the user, and others in the room. Controls will be available through the interface, e.g. phone prompt system, which will enable the user to perform functions during the streaming such as pause, fast forward, rewind, and stop just like a typical DVD player. Thus, a Therefore, by phone prompts a teacher is able to select a particular video for the class using the phone in the classroom phone.

Another example of how the controller 12 may be interfaced from the classroom is through a PC that is patched directly into the controller (see FIG. 4) or by way of a network computer. These techniques will be discussed in detail later.

An important advantage to using system 10 is that it does not demand any interaction with the existing IP network in use in the facility. These IP networks are typically not designed to handle the amount of data traffic required to manage the streaming of audio-video files there across. Though controller may be interfaced using the existing data network in the facility, the traffic created by doing so is minimal, because it does not involve the heavier streaming activity. Thus, the interfacing from the existing and is unlikely to have any significant effect on the network. It is the type of data communications that these traditional systems are typically designed to handle. Here, with the FIG. 2 arrangement, the teacher is able to select a video for her class, have it streamed from server 16, decoded by decoder 14, and then delivered to her class on media player (MP1) 26 without ever significantly involving the facility's IP network.

Figure 3:
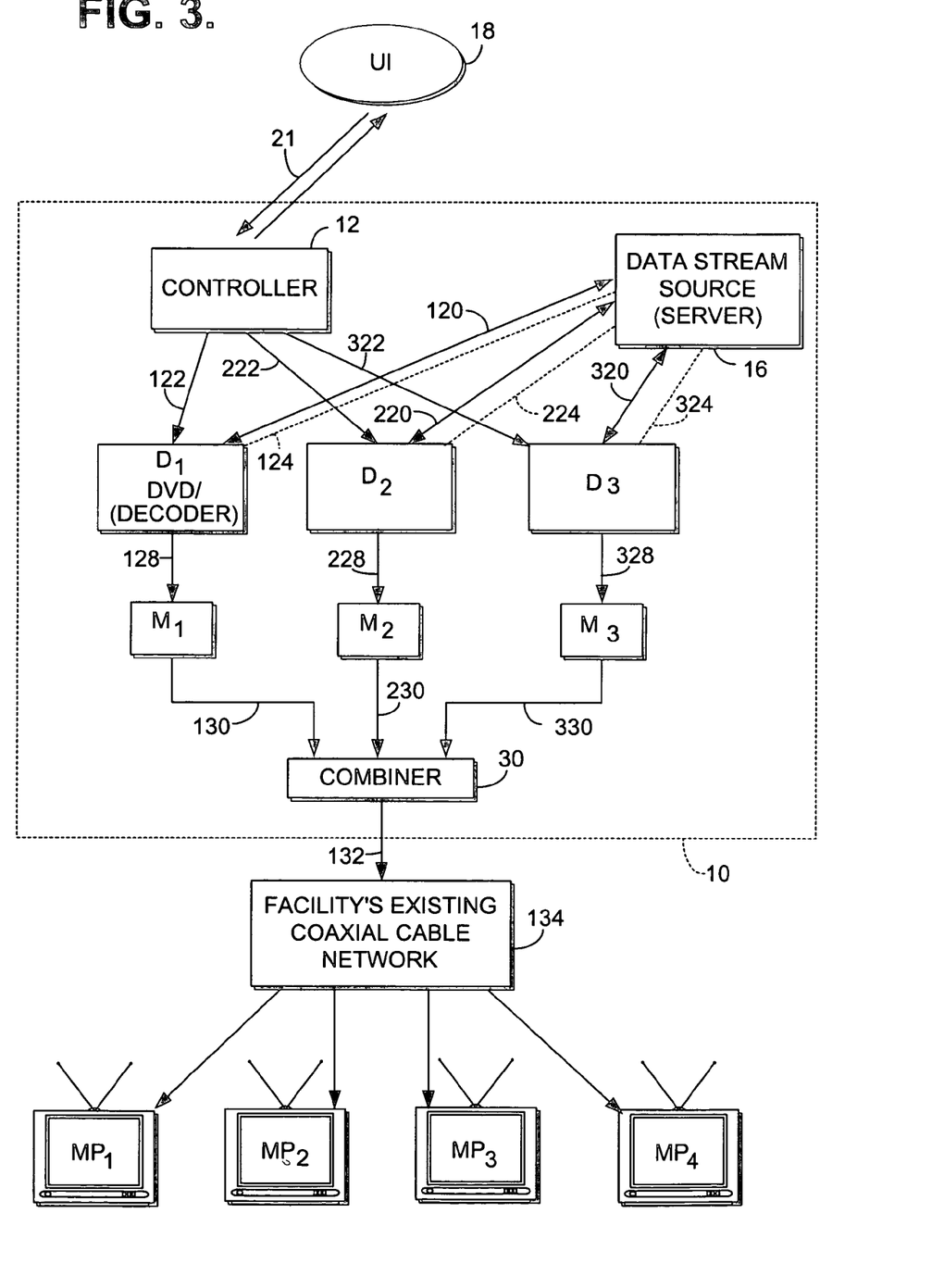
FIG. 3 shows a more complex version of the system of the present invention in which multiple DVD/decoders are controlled by the same controller and a facility's coaxial cable network includes numerous media players.

FIG. 3 shows essentially the same arrangement, however with additional DVD/decoders in use. A FIG. 3 kind of arrangement, with multiple DVD decoders and multiple media players would be more common in a school where there are multiple classroom, each of which might be interested in playing different audio/video content. The figure provides more details disclosed regarding the facility's cable network and other components of administrator 10. The FIG. 3 embodiment shows that a single controller 12 is able to communicate via infrared signals 122, 222, and 322 with three separate DVD/decoders, DVD/decoder $D_1$, DVD/decoder $D_2$, and DVD/decoder $D_3$, respectively. DVD/decoders $D_1$, $D_2$, and $D_3$ each have communication channels 120, 220, and 320 which enable them to communicate with data stream source 16 each in the same manner as described in the FIG. 2 embodiment. Again, channels 120, 220, and 320 may be simple Ethernet connections, or alternatively might be some other kind of physical or wireless connection.

DVD/decoder $D_1$ may be prompted by controller 12 via infrared signal 122 to stream video from source 16. The signaling and streaming to decoder $D_1$ will both occur through channel 120. Just like with the FIG. 2 embodiment. E.g., delivery of a particular MPEG video data stream 124) to DVD/decoder D1 will usually occur via channel 120. The particular file on source 16 is selected by a user in the particular classroom in which the movie is to be played using the software installed on source 16 in the same manner as described above for the FIG. 2 embodiment.

Similarly, controller 12 is able by infrared signal 222 to communicate with source 16 over a second channel 220. Using the software installed on source 16, the user is able to select an MPEG and cause it to be delivered as a data stream 224 over a second channel 220 to DVD/decoder $D_2$.

Likewise controller 12 is able, by infrared signal 322 to communicate with source 16 over a third channel 320. A third MPEG data stream 324 will then be delivered over third channel 320 for conversion to analog by DVD/decoder $D_3$.

Each of DVD/decoders $D_1$, $D_2$, and $D_3$ convert the digital streamed signals received. Signals 124, 224, and 324 are converted into analog signals 128, 228, and 328 respectively. Signals 28, 228, 328 are all analog signals as would be transmitted by a typical DVD/VCR player.

These separate signals are then each modulated for delivery over the cable system of the facility. This is done using modulators $M_1$, $M_2$, and $M_3$. Modulator $M_1$ is used to create a modulated signal 130 for transmission through the facilities network. Similarly, modulator $M_2$ is used to create a modulated signal 230. Modulator $M_3$ is used to create a modulated signal 330. Signals 130, 230, and 330 are then combined into one signal. After leaving modulators $M_1$, $M_2$, and $M_3$, modulated signals 130, 230, and 330 are combined into one modulated signal 132 by a combiner 30. Modulator combiners like combiner 30 will be well known and available to one skilled in the in the art. Combiners simply receive the outlines of the modulators and combines the signals of different modulators into a common signal for distribution over a coaxial network.

Device 10 via this arrangement is able to deliver combined signal 132 from combiner 30 into the facility's existing coaxial cable network 134. Network 134 receives modulated signal 132 and is able to access this signal to a plurality of media playing devices. As shown in FIG. 3 these devices are $MP_1$, $MP_2$, $MP_3$, and $MP_4$. Each of these devices like almost any media device like a television, may typically access different audio/video content by changing channels.

Here, however, by changing channels in combination with interfacing with the DVD/decoders through controller 12, the user may accomplish video on demand in each classroom in which each of media players $MP_1$, $MP_2$, $MP_3$, and $MP_4$ are located.

By going to a predesignated channel corresponding to DVD/decoder $D_1$, the user may order a file off of server 16 in the same manner as provided in the FIG. 2 embodiment. If DVD/decoder $D_1$ is in use, however, the user may simply flip to an alternative channel to access DVD/decoder $D_2$. If DVD/decoder $D_2$ is in use, the user may flip to a third channel and access DVD/decoder $D_3$. Thus, the user has numerous ways in which to obtain access to the particular file he or she is trying to access.

For example, lets say $MP_1$ and $MP_2$ are located in different school classrooms. Both classrooms want to play the same instructional video for their class at the same time. To accomplish this, a first teacher in one of the two classrooms would turn to a predesignated channel on the media player in that classroom, $MP_1$. Then, the first teacher interface with controller 12 using a means to interface located in that classroom—maybe the phone, or a computer in the room. If the phone system is used, the teacher would interact with controller 12 through a series of voice prompts. The controller 12 would then act in response to communicate with one of the DVD/decoders, $D_1$, $D_2$, or $D_3$. For the purpose of this example, lets say DVD/decoder $D_1$ is selected. All of the interfacing could be viewed by first teacher over media player $MP_1$.

In response to the interfaced commands by first teacher, controller 12 would dispatch corresponding infrared signals to DVD/decoder $D_1$. DVD/decoder $D_1$ would then act on these signals to interface with server 16 through channel 120. The software on server 16 will enable him or her to locate the appropriate file on server 16 using the controlled DVD/decoder $D_1$. All the while, first teacher will be able to see what they are doing on the media player in his or her room, and by way of the voice prompts. Thus, first teacher will be able to select the appropriate audio/video file.

Once the file is selected, it will be streamed to DVD/decoder $D_1$ through channel 120 as data stream 124. The digital data stream will then be decoded by DVD/decoder $D_1$ and then modulated by modulator $M_1$. The modulated signal 130 will then be delivered into combiner 30 along with any other media being streamed from DVD/decoders $D_2$ and $D_3$ and transmitted into the cable network 134. The signal will then be demodulated by the television in her room, $MP_1$. The video presentation will then be made to first teacher's class.

Next door, in the second teachers class, the same presentation may be received simultaneously. To do this, second teacher need only turn her television set ($MP_2$) to the same predetermined channel.

In another classroom, different video content may be selected and viewed on demand. A third teacher in this classroom containing player $MP_3$, may want to show a different audio/visual presentation than the one being shown by the first and second teachers. To do so, she might interface with controller 12 to, via infrared signal 122 compel DVD/decoder $D_2$ to select a particular file off of server 16 using communications channel 220. Third teacher would follow the same process as described above for the first teacher, except that DVD/decoder $D_2$ would be accessed. This is necessary because DVD/decoder $D_1$ is already in use by the first and second teacher's classrooms.

The data stream 224 created by third teacher's selection would be delivered back through channel 220 to DVD/decoder $D_2$, where it would be decoded. The resulting analog signal 228 would then be modulated by modulator $M_2$, combined with the modulated signal 130 coming from DVD/decoder $D_1$, and then delivered in combined signal 132 into the facilities cable network 134.

In order to access the audio/video content, third teacher would need only to turn to a predesignated channel—one different from the channel predesignated by first and second teachers.

A fourth teacher in a fourth classroom might want to play yet another video in his class. Using the same procedures described above for the third teacher, fourth teacher might play a video file different than that being shown in the other classrooms at the same time. This could be done by interface with controller 12 to, via infrared signal 222 compel DVD/decoder $D_2$ to select a particular file off of server 16 using communications channel 320. Fourth teacher would follow the same process as described above for the first and third teachers, except that DVD/decoder $D_3$ would be accessed. This is necessary because DVD/decoders $D_1$ and $D_2$ are already in use by the other classrooms.

Third data stream 324 created by third teacher's selection would be delivered back through channel 320 to DVD/decoder $D_2$, where it would be decoded. The resulting analog signal 328 would then be modulated by modulator $M_3$, combined with the modulated signals 130 and 230 coming from DVD/decoders $D_1$ and $D_2$, respectively, and then delivered therealong in combined signal 132 into the facilities cable network 134.

In order to access his desired audio/video content, fourth teacher would need to turn to a different predesignated channel—different from the channels accessed by the other teacher's classes.

These examples show that numerous combinations are possible. Any of the players may view content delivered from any of the DVD/decoders at any time. Further, assuming that there is a DVD/decoder available, the user may obtain video on demand at any time. Thus, in the preferred embodiment, there should be enough DVD/decoders used such that there is always one available to users in the facility. Thus, it should not be viewed as a limitation on the present invention that only three DVD/decoders and four media players are disclosed here. It would be more common considering the standard school to use many more. These embodiments have been used for the sake of simplicity.

Likewise, though controller 12 has been shown here to control only three decoders, it will be readily apparent to one skilled in the art that it could also be used to control many more DVD/decoders. It may control three, six, ten or even more decoders if need be. Three decoders have been chosen here simply for demonstrative purposes.

Further, it is also possible to use plural controllers in a facility, each of which controls a plurality of decoders. These controllers may even be adapted to communicate with eachother.

As with the embodiment disclosed in FIG. 2, the FIG. 3 embodiment also avoids any disruption of the IP network of the facility. This is because all of the data streaming is done within system 10. The only possible involvement of the facility's IP network is if the network is used to interface with the controller (serve as the user interface 18). Controller 12, however, is also capable of interfacing with the school's phone system, or with a PC patched directly into it with a serial connection. Regardless, all of the interfacing traffic is of a very low volume. Nothing compared to the volume involved in data streaming, such as the data streaming done within the system 10.

FIG. 4, like FIG. 2 already discussed shows only one DVD/ decoder in use for simplicity sake. It is important to note, that the FIG. 4 embodiment, like that of FIG. 2 would normally be used with multiple decoders like with the FIG. 3 arrangement. Only one DVD/decoder is shown in FIG. 4, however, such that more specifics may be provided with respect to the user interfacing that may be done with the system, and also so that more arrangements with respect the internal networking of the system may be discussed.

The additions to the FIG. 4 embodiment are as follows. First, an internal network 42 and a system server 44 are provided. Second, the user interface 18, it is shown as comprising a telephone system 36, a PC which is hooked directly into the controller 38 and a PC 40 which is patched in by an IP connection into the internal network 42 of the administrator 10. None of these features were depicted in the already discussed drawings (though possibly discussed briefly in the above description).

We will first discuss the possibilities for user interface 18. Each of the possible interfacing devices will most likely will be maintained in the particular room in the facility in which the media devices MP1, MP2, MP3, or MP4 are located. Of these potential interfacing devices, a phone system 36 may be used. Phone system 36 is possibly physically connected into controller 12 by use of a standard phone line 48. It could also be patched into controller 12 digitally or by some kind of wireless connection, however.

The phone system will be used to interface with the controller in the manner described above. The controller is programmed in such a way to cause the user to be given a series of prompts, and to act upon the answers given, either by voice activation, or by the user hitting particular keys on the phone to make selections. This interchange will enable the user to select a particular video file included in server 16 through infrared signaling of DVD/decoder $D_1$ as described above. DVD/decoder $D_1$ then communicates with video server 16 through internal network 42. Internal network 42 is maintained completely separate from the network of the facility and is operated with the assistance of system server 44. Additionally, the controller may communicate directly with the internal network through an IP connection 54.

A particular file may be selected via channel 20 which is patched into network 42. On the other side of network 42, channel 21 may be used to send and receive file selection signals to and from the video server. Once the particular file is selected, video is streamed through internal network 42 in stream 24 and received by DVD/decoder $D_1$.

DVD/decoder $D_1$ then converts the signal the analog signal 28 which is modulated by modulator $M_1$ into a modulated signal 130 which is received by the facilities network 134.

Rather than use a phone hookup, a PC 38 may alternatively be patched directly into controller 12 through a standard serial connection 50. This computer will enable the user to, through controller 12, also select video content off of server 16 which will be transmitted through the internal network 42 to the decoder D1. The function of the system when using PC 38 instead of the phone system is essentially the same downstream from controller 12. But with a computer, the content selection will be made by a series of commands dispatched from PC 38. Software will be used on PC 38 which enables the user to do this. Additionally, a computing component in the controller is able to accomplish the processing of these signals and use them to cause the control of the decoder by infrared.

The user, e.g., teacher, simply uses software on PC 38 to locate the desired content on server 16 which will be delivered through the internal network to the decoder.

Another alternative in terms of interfacing with controller 12 is the use of a PC 40 which connects directly into internal network 42 using an IP connection 52. Internal network 42 may be controlled by a system server 44. Though IP connection 52 is shown being into internal network 42, it also could be considered to be hooked directly into system server 44 in a similar arrangement. The function of PC 40 would be essentially the same as PC 38, except that it, rather than being connected directly and physically into controller 12, would be able to utilize it through internal network 42 through connection 54. Internal network 42 and associated system server 44 includes software enhancing the functionality of controller 12. This software cooperates with the server 16 to more easily and practically deliver content as needed.

Figure 5:
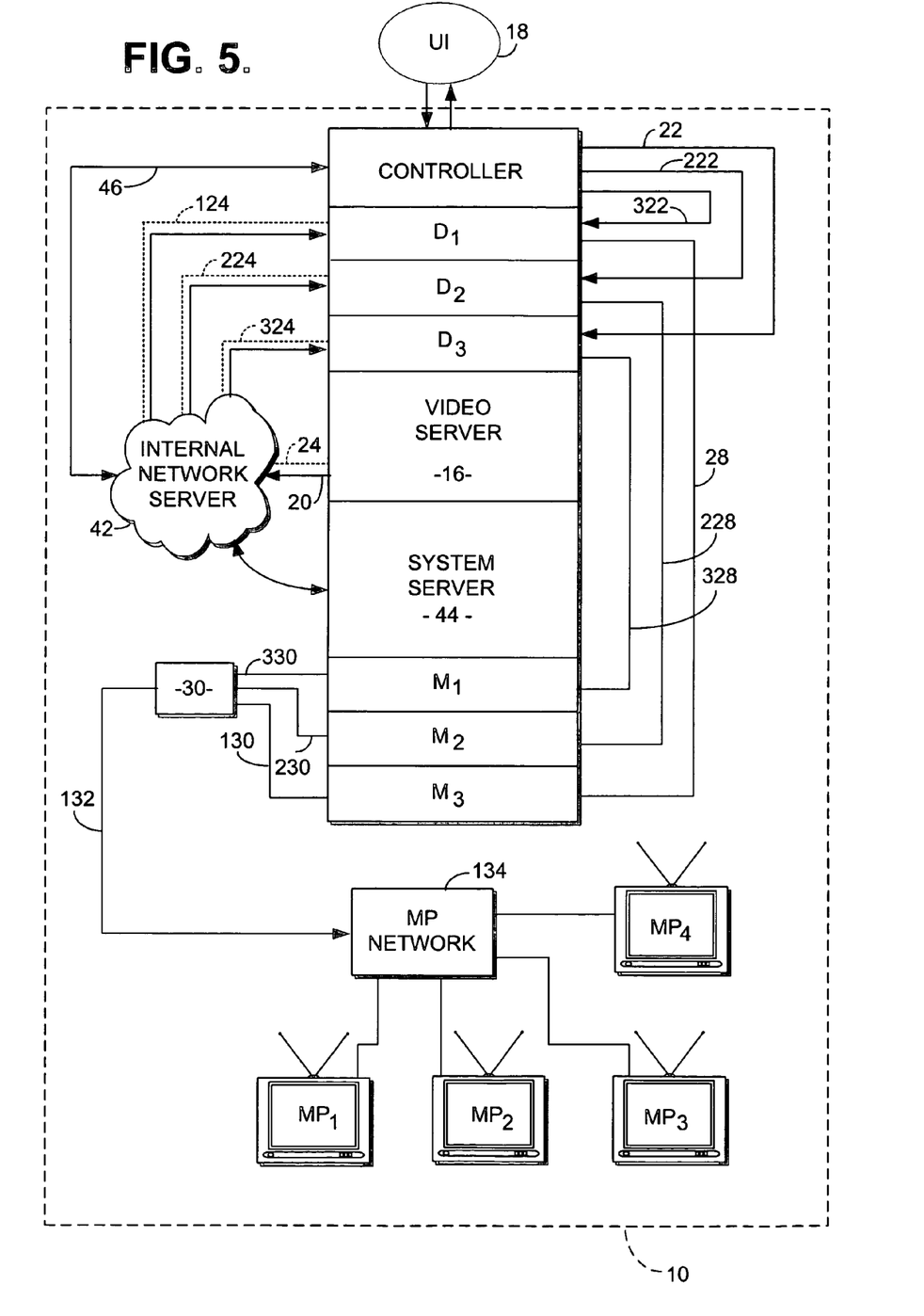
FIG. 5 shows the components of the system of the present invention as they might be stacked in a server rack, and the functional relationship between these components.

FIG. 5 shows the system of the present invention as it might appear in a server rack with all of the components stacked one on top of the other. This embodiment includes multiple decoders $D_1$, $D_2$, and $D_3$ like in FIG. 3, but also includes some of the internal components added in FIG. 4, such as the internal network 42 and system server 44. Also like in FIG. 3, three modulators $M_1$, $M_2$, and $M_3$ are provided. Though the number of DVD/decoders is shown in this embodiment to equal the number of modulators, it is important to note that the invention should not be so limited. You could actually have multiple DVD/decoders matched up with a single modulator or vice versa. It may prove economically more feasible to match up several decoders with one modulator. FIG. 5, though not adding any real additional features, may help illustrate how the system 10 is physically contained in addition to being contained in terms of signaling.

The entire system actually can actually be contained in a single equipment rack. An equipment rack is not pictured in FIG. 5 specifically, though one skilled in the art would know that devices such as DVD/decoders, video servers, system servers, modulators and the controller of the present invention may be easily stored and maintained on a standard server rack at some location within the facility. Thus, the components may be neatly and efficiently stored at some desired location within. The interfacing (through user interface 18), however, is done from numerous different locations, as discussed above. Usually an interface will be provided within each location of a media player device such as $MP_1$, $MP_2$, $MP_3$, or $MP_4$. In other words, a telephone will be located in the same room as $MP_1$ which will enable the user to access all of the functionality of system 10 from that location and deliver a program as desired on the video monitor. Similarly, a PC may exist in the same room as $MP_3$ which enables the user (e.g., a teacher) to access desired video content from his or her desktop computer.

System 10 handles all of the heavy volume involved in delivering on-demand video. It is separate, however, from the facility's existing IP network. Thus, the school's vintage IP network will not be brought down when video is being streamed from classroom to classroom as would be done in the prior art methods. Because the arrangement of the present invention may be used with the existing phone, computer, and cable network of the facility, expense is drastically reduced from the prior art methods.

We will now discuss some of the details regarding controller 12. For even more specifics regarding the functionality of controller 12, we would direct your attention to U.S. patent application Ser. No. 10/694,337, filed Oct. 27, 2003. The contents of that application are herein incorporated by reference in their entirety and are to be considered a part of this original disclosure.

Figure 6:
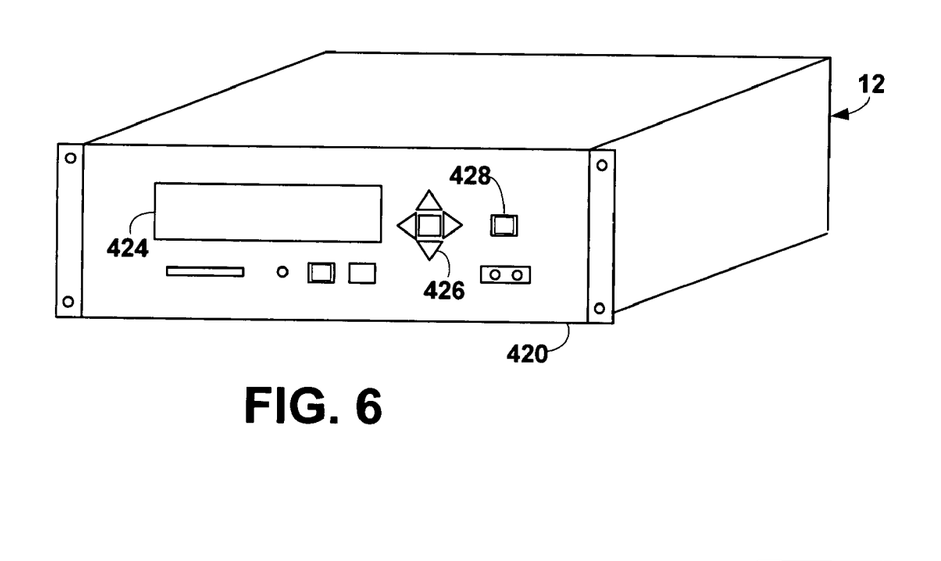
FIG. 6 is a front-view perspective showing the features on the front of the housing of the communications controller of the present invention.
Figure 7:
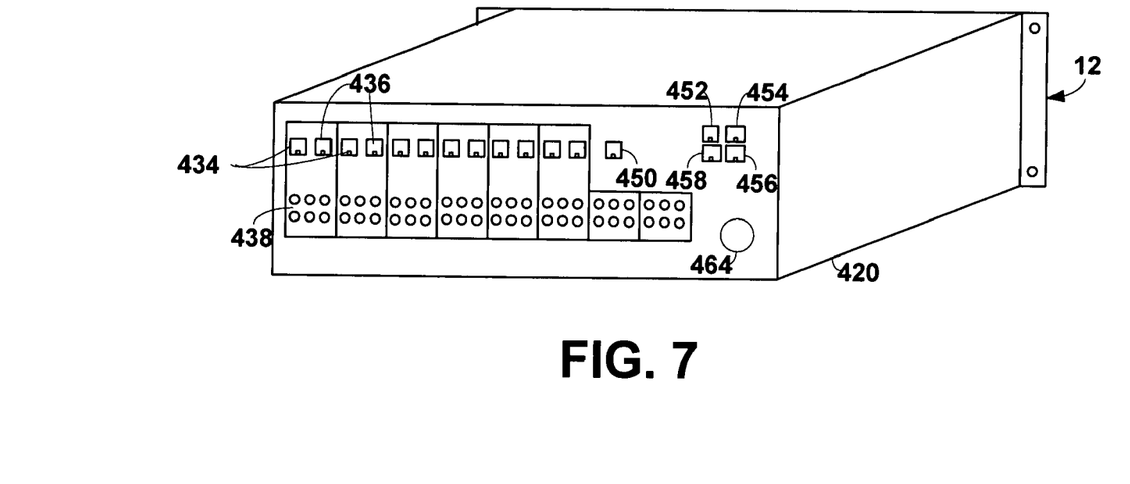
FIG. 7 is a rear-view perspective showing the external features on the rear of the housing of the controller of the present invention.

A front view perspective of this device is shown in FIG. 6, and a rear view of this device is shown in FIG. 7. Referring to FIGS. 6 and 7, a rack mount housing 420 is provided which encases controller 12. Controller 12 includes a processing component. This processing component comprises a microprocessor, supporting memory (RAM), an Ethernet controller, a DTMF controller, and additional control circuitry for processing and controlling requests between various system components. The microprocessor is programmed using a menu-driven electronic display accompanied by a set of push buttons. The display 424 and push buttons 426 may be seen in FIG. 6. This electronic display 424 along with push buttons 426 may be used as an alternative of the interfacing arrangements described in FIG. 4. Using these, the user is able to pick video content using display 424 directly on the unit 12. Also included is a cancellation push button 428.

On the back side of device 12 as may be seen in FIG. 7 are a number of connective functional features of the controller 12 of the present invention. These features include a power connector 464. This receives a standard three-prong female hookup just like would be used with a PC or server. The controller may be connected with a PC like PC 38 shown in FIG. 4 using serial port 452. A TCIP network-to-server connector 454 is located right next to the serial port connector. This is the connector that is used to either hook in system server 44 (see FIG. 4) directly or hook it in indirectly through internal network 42. Also seen on the back of controller 12 are a plurality of IR emitters 434. These emitters are used to send specific signals to the DVD/decoders such as playback, reverse, pause, and other similar commands. A bulk emitter 450 is also provided. This bulk emitter usually serves to send on/off signals to the DVD/decoders. The phone system of the facility 36 (see FIG. 4) is patched into controller 12 using a plurality of phone connections 436 o the back side of device 12. Each jack 36 may relate to a specific classroom and be wired directly thereto or through some other form of telephonic connective arrangement. A plurality of RCA-type jacks 438 are provided which are used to perform functions where controller 12 sends out audio-visual signals itself. Sometimes these are all call functions. These functions will not be described in detail herein but may be gleaned from the prior application referred to above.

The internal functioning of controller 12 are discussed in the earlier filed application referenced above, and are not, thus, discussed in detail here. Generally, though, controller 12 contains processing components and data storage components. It will have to be programmed to accomplish all the objectives disclosed above. These components enable the controller to successfully interface with the phone system 36 (see FIG. 4), serially connected PC 38 and facility network PC 40 using internal components and software known of and falling within the scope of what would be known to one skilled in the art. The infrared transmission capabilities of the controller will also be set up by one skilled in the art. Numerous hand held remote control devices have used infrared technologies for controlling electronics components for years.

Because most of the specifics regarding how the controller executes all of these functions would fall within the knowledge and skill of one skilled in the art, the specifics regarding these processes and hardware are not discussed in detail here.

As can be seen, the present invention and its equivalents are well-adapted to provide a new and useful method of and system for delivering media content within a facility. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for managing the display of media on a plurality of media systems of a facility, the system comprising:
a data stream source operable to store audio-visual files in digital format including multiple instances of each of the audio-visual files for simultaneous access by a plurality of media players;
a first decoder in communication with the data stream source and operable to receive a first audio-visual file selected from the audio-visual files, the first decoder further operable to convert the first audio-visual file into a first analog signal;
a second decoder in communication with the data stream source and operable to receive a second audio-visual file selected from the audio-visual files, the second decoder further operable to convert the second audio-visual file into a second analog signal, each of the first decoder and the second decoder communicating with the data stream source through a separate communications channel;
a controller in communication with the data stream source through a data network and operable to select the first audio-visual file in response to a selection made by a user through a user interface provided by the controller, the user interface communicates prompts and selections to the user through one of the plurality of media players, the user interface including a phone interface and a computer interface to the controller for receiving user input, wherein the phone interface is a telephone communicating with the controller through an existing phone system, wherein actions taken by the controller and the prompts and selections are displayed by a media player in the same room as the telephone, wherein the user controls playback of the audio-visual file using the telephone, wherein the controller is enabled to be connected to a personal computer displaying the computer interface to receive the selection through a wireless connection, a wireline connection, and a serial connection, the selection of the first audio-visual file being made in response to the controller communicating with the first decoder using an infrared signal, the controller being further operable to select a second audio-visual file, the selection of the second audio-visual file being made in response to the controller communicating with the second decoder using an infrared signal, wherein streams of the audio-files from the data stream source are not communicated through the data network, and wherein the controller controls a plurality of decoders associated with the plurality of media players including the first decoder and the second decoder utilizing a plurality of infrared signals designated for each of the plurality of decoders;

a first modulator in communication with the first decoder and operable to receive the first analog signal and modulate the first analog signal for communication over a first coaxial cable;

a second modulator in communication with the second decoder and operable to receive the second analog signal and modulate the second analog signal for communication over a second coaxial cable, the first coaxial cable and the second coaxial cable are part of a coaxial cable network separate from the data network; and a combiner in communication with the first modulator and the second modulator, the combiner operable to combine the first analog signal and second analog signal into a combined analog signal, each of the first decoder and second decoder being associated with a dedicated channel in the combined analog signal, a plurality of dedicated channels available to each of the plurality of media players through the coaxial cable network, one or more of the plurality of media players decoding the first analog signal and the second analog signal from the combined analog signal, wherein the second coaxial cable communicates with a second media player, and wherein the first coaxial cable communicates with a first media player, wherein each of the plurality of decoders including the first decoder and second decoder being associated with one of a plurality of dedicated channels in the combined analog signal, wherein the first and second analog signals are combined into the combined analog signal having at least two channels, a first of the two channels carrying the first analog signal and the second of the two channels carrying the second analog signal, the combined analog signal being communicated over the coaxial cable network to the first media player, the first media player operable to display the selection of the first channel for display of the content of the first audio-visual file, wherein the content of the first audio-visual file is displayed on a second media player in response to a further selection of the first channel using the second media player, wherein the first and second media players are each delivered the content of the first audio-visual file over the first channel for simultaneous display in response to a selection of the first channel, and wherein each of the plurality of media players displays content selected for playback on the plurality of decoders associated with each of the plurality of dedicated channels in response to being powered on and one of the plurality of dedicated channels being selected.

2. The system of claim 1, wherein the computer interface is a computer in a room with the controller communicating with the controller through a serial connection.

3. The system of claim 2, wherein the computer communicates with the controller through a network connection.

4. The system of claim 1, further comprising:
a plurality of controllers in communication with the controller.

5. The system of claim 1, wherein the separate communications channel is a wireless channel.

\* \* \* \* \*